United States Patent
Yoshida et al.

(10) Patent No.: US 7,748,890 B2
(45) Date of Patent: Jul. 6, 2010

(54) GAS PROCESSING DEVICE

(75) Inventors: Naohiro Yoshida, Nisshin (JP);
Toshiyuki Kondo, Chiryu (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 462 days.

(21) Appl. No.: 10/572,365

(22) PCT Filed: Oct. 25, 2004

(86) PCT No.: PCT/JP2004/016190

§ 371 (c)(1),
(2), (4) Date: Mar. 16, 2006

(87) PCT Pub. No.: WO2005/044432

PCT Pub. Date: May 19, 2005

(65) Prior Publication Data
US 2007/0053237 A1 Mar. 8, 2007

(30) Foreign Application Priority Data
Nov. 7, 2003 (JP) ............................. 2003-379094

(51) Int. Cl.
*B01F 15/00* (2006.01)
*H01M 8/04* (2006.01)
(52) U.S. Cl. ..................... 366/165.1; 429/17
(58) Field of Classification Search .............. 429/34, 429/17; 366/165.1
See application file for complete search history.

(56) References Cited

U.S. PATENT DOCUMENTS

| | | |
|---|---|---|
| 2,850,038 A | 9/1958 | Shabaker |
| 3,711,256 A | 1/1973 | Williams |
| 4,793,712 A | 12/1988 | Kostecki |
| 5,059,494 A | 10/1991 | Vartanian et al. |
| 5,113,028 A | 5/1992 | Chen et al. |
| 5,573,334 A | 11/1996 | Anderson |
| 5,868,495 A | 2/1999 | Hidalgo |
| 5,939,218 A | 8/1999 | Mizuno |
| 5,958,614 A | 9/1999 | Takei et al. |
| 6,124,054 A | 9/2000 | Gorman et al. |
| 6,395,414 B1 | 5/2002 | Clingerman et al. |
| 6,455,181 B1 | 9/2002 | Hallum |

(Continued)

FOREIGN PATENT DOCUMENTS

AT 195406 2/1958

(Continued)

*Primary Examiner*—Patrick Ryan
*Assistant Examiner*—Thomas H. Parsons
(74) *Attorney, Agent, or Firm*—Oliff & Berridge, PLC (57) ABSTRACT

A gas processing device for mixing a first gas (H2) and a second gas (air) comprises a flow passage (110) through which the second gas (air) passes, an inflow port (104) for introducing the first gas (H2) in a non-parallel direction to the flow direction of the second gas (air) within the flow passage (110), and a housing (101) for sealing a part of the flow passage (110). The flow passage (110) comprises hole structures (111), through which the second gas (air) and first gas (H2) pass in and out, in at least a part of the region sealed by the housing (101). According to this constitution, the hole structures generate turbulence, and hence the degree of mixing between the first gas (H2) and second gas (air) can be improved, enabling a uniform reduction in the gas concentration.

12 Claims, 9 Drawing Sheets

U.S. PATENT DOCUMENTS

| | | | |
|---|---|---|---|
| 6,767,007 B2 * | 7/2004 | Luman | 261/76 |
| 6,916,563 B2 | 7/2005 | Yamamoto et al. | |
| 2002/0094469 A1 | 7/2002 | Yoshizumi et al. | |
| 2002/0185552 A1 | 12/2002 | Adamson et al. | |

FOREIGN PATENT DOCUMENTS

| | | |
|---|---|---|
| DE | 99 511 | 8/1973 |
| DE | 35 11 927 A1 | 10/1986 |
| DE | 39 08 914 A1 | 9/1990 |
| DE | 35 37 527 C2 | 6/1992 |
| DE | 199 33 680 * | 12/2000 |
| DE | 199 33 680 C1 | 12/2000 |
| DE | 100 65 459 A1 | 8/2001 |
| DE | 102 49 183 A1 | 7/2003 |
| EP | 0 600 464 A1 | 6/1994 |
| EP | 1 254 699 A1 | 11/2002 |
| GB | 694918 | 7/1953 |
| GB | 1 453 469 | 10/1976 |
| GB | 2 242 563 A | 10/1991 |
| JP | A-04-100528 | 4/1992 |
| JP | A-05-330941 | 12/1993 |
| JP | A-08-138697 | 5/1996 |
| JP | A 9-22714 | 1/1997 |
| JP | A-09-280009 | 10/1997 |
| JP | A-09-287883 | 11/1997 |
| JP | A-10-026306 | 1/1998 |
| JP | A-10-189010 | 7/1998 |
| JP | A 2000-348743 | 12/2000 |
| JP | A-2001-021111 | 1/2001 |
| JP | A 2002-289237 | 10/2002 |
| JP | A-2002-361056 | 12/2002 |
| JP | A 2003-77484 | 3/2003 |
| JP | A 2003-132915 | 5/2003 |
| JP | A-2004-220809 | 8/2004 |
| WO | WO 01/18451 A1 | 3/2001 |

* cited by examiner

GAS PROCESSING DEVICE

TECHNICAL FIELD

The present invention relates to a device for diluting purge gas from a fuel cell, and more particularly to a constitution suitable for diluting purge gas evenly.

BACKGROUND

In a fuel cell, hydrogen serving as fuel is circulated for reuse. When a fuel cell is used as a power source for an electric automobile, a purging operation is sometimes performed to discharge a part of the hydrogen in the circulation system outside. For example, a purging operation is required to restore the fuel cell voltage when the voltage drops temporarily, or to reduce a difference in pressure between the electrodes of the fuel cell arising when the vehicle is stationary.

When the hydrogen in the circulation system is to be discharged outside in a purging operation, a diluter is used to dilute the hydrogen with air so that the hydrogen concentration is reduced below its combustion limit. For example, Japanese Patent Application Publication No. 2003-132915 discloses a technique of diluting hydrogen off-gas to or below this concentration by retaining the purged hydrogen off-gas in a tank and gradually mixing the hydrogen off-gas with air which passes through an adjacent tank (Patent Document 1).

Patent Document 1: Japanese Patent Application Publication No. 2003-132915 (FIG. 2 etc.)

Patent Document 2: Japanese Patent Application Publication No. 2000-348743 (paragraph number 0029, FIG. 2, etc.)

Patent Document 3: Japanese Patent Application Publication No. 2002-289237 (FIG. 8 etc.)

SUMMARY

However, with the conventional dilution constitutions noted above, it is not always possible to dilute the hydrogen concentration sufficiently in localized areas below a combustible concentration. In the diluter constitution disclosed in Japanese Patent Application Publication No. 2003-132915, when the retained hydrogen is conducted to the air side, the hydrogen concentration may remain high in localized areas such that the hydrogen is discharged at this high concentration.

It is therefore an object of the present invention to provide a gas processing device which is capable of solving this problem by sufficiently mixing and diluting a plurality of gases.

To solve the problem described above, the present invention is a gas processing device for mixing a first gas and a second gas, characterized in comprising turbulence generating means for generating turbulence in at least one of the first gas and the second gas so that the two gases are mixed.

According to this constitution, the turbulence generating means generates turbulence, and hence the degree of mixing between the first gas and second gas can be improved, enabling a uniform reduction in the gas concentration. When one of the first gas and second gas is a combustible gas, for example, the concentration of the combustible gas can be reduced evenly and then discharged outside.

Here, there are no limitations on the "first gas" and "second gas". For example, the first gas may be hydrogen and the second gas may be air.

The gas processing device according to the present invention comprises a housing through which the second gas flows. An inflow port for introducing the first gas from a non-parallel direction to the flow direction of the second gas is provided in the housing.

According to this constitution, the inflow port is provided such that the first gas is introduced from a non-parallel direction to the flow direction of the second gas, or in other words a different direction such as transversely or diagonally, and hence the flow of first gas into the housing from the inflow port flows in a non-parallel direction to the direction of the flow passage. As a result, the flow of first gas collides with the second gas to generate turbulence, and hence the two gases are mixed evenly.

Here, the inflow port is provided to enable the first gas to flow in from an offset position from the axial center of the housing. According to this constitution, the inflow port is offset from the axial center, and hence a rotational flow which swirls within the housing is produced in the first gas. As a result, the second gas which leaks into the housing through hole structures can be mixed evenly with a high degree of efficiency. Since a rotational flow is produced in the first gas, components of the first gas having a comparatively large mass, such as moisture, are subjected to centrifugal force, thus becoming adhered to the wall surface of the housing, and hence this moisture component and so on can be separated.

Here, a flow passage through which the second gas flows is provided so as to be at least partially sealed by the housing. The flow passage preferably comprises hole structures through which the second gas and first gas pass. A part of the flow passage is surrounded by the housing, and the hole structures are provided in the part of the flow passage that is covered by the housing. Hence the second gas passes into and out of the housing through the hole structures in the flow passage in a different direction to the flow direction of the second gas through the flow passage, thereby mixing with the first gas which generates turbulence within the housing.

Here, a liquid discharge port may be provided in a lower portion of the housing in the vertical direction thereof. According to this constitution, components of the first gas having a comparatively large mass, for example moisture obtained through aggregation, may be discharged.

Further, the housing may comprise in at least one part thereof an agitating member for agitating the gas. According to this constitution, the agitating member creates further localized turbulence in the airflow within the housing so that the first gas and second gas can be mixed more evenly.

Here, the "agitating member" may be any object which is capable of creating a disturbance in an airflow by being placed within the airflow, for example glass wool. When glass wool is used as the agitating member, it can double as a silencer for absorbing the vibration of a fluid such as gas produced when the gas flows or sound waves from the upstream side.

Here, the agitating member may be disposed on the downstream side of the gas flow direction through the housing, a space may be formed on the upstream side of the gas flow direction through the housing, and the liquid discharge port may be provided in a lower portion of the space in the vertical direction thereof. According to this constitution, unnecessary components such as moisture obtained through aggregation can be discharged from the space near the inflow port for the first gas, and hence these unnecessary components such as moisture can be prevented from accumulating in the agitating member.

The present invention may be constituted to comprise a first flow passage through which the first gas flows, comprising a diffusion structure for diffusing the first gas outside, and a second flow passage surrounding the first flow passage so as to cause the second gas to flow around the first flow passage.

According to this constitution, the second flow passage surrounds the first flow passage, and hence the first gas is mixed into the second gas. As a result, localized unevenness in the gas concentration can be suppressed, and an improvement in the dilution performance can be expected. Further, since the first flow passage is enveloped by the second flow passage, the need to provide a space for a diluter or mixer disappears, enabling a space-saving constitution. When the first gas is a combustible gas and the second gas is a noncombustible gas, for example, the concentration of first gas can be reduced evenly to the extent that the mixed gas does not burn.

Also according to this constitution, the second gas flows around the first flow passage, and hence even when moisture or the like is contained in the first gas which flows through the first flow passage and the environmental temperature falls to or below the freezing temperature of the moisture or the like, freezing of the first flow passage can be suppressed as long as the temperature of the second gas is higher.

Here, the aforementioned diffusion structure may be a plurality of hole structures which emit the first gas flowing through the first flow passage in a different direction to the flow direction of the second gas. According to this constitution, the first gas is emitted into the flow of second gas, and hence the first gas and second gas collide, generating turbulence, which enables an improvement in the dilution performance.

Here, the hole structures may be provided such that the total hole opening area per unit area becomes larger toward the downstream side of the flow direction of the first gas. According to this constitution, the first gas concentration is higher toward the upstream side of the first flow passage and lower toward the downstream side, and hence when the first gas emitted from the hole structures mixes with the second gas, the concentration of first gas within the mixed gas can be made even in all locations, thus enabling unevenness in the concentration of the first gas within the second flow passage to be suppressed.

Here, the hole structures are preferably provided at least in the lower portion of the first flow passage in the vertical direction thereof. According to this constitution, when a liquid component such as water is contained in the first gas, for example, liquid which aggregates inside the first flow passage can be discharged outside without accumulating in the flow passage.

Here, the hole structures are preferably provided at least in the upper portion of the first flow passage in the vertical direction thereof. According to this constitution, the first gas can be discharged outside, or in other words into the second flow passage, without accumulating near the roof of the first flow passage, and can thus be mixed with the second gas.

Here, the diffusion structure preferably emits the first gas flowing through the first flow passage in a substantially orthogonal direction to the flow direction of the second gas. According to this constitution, the first gas flows out orthogonally to the second gas, thereby colliding with the second gas to produce turbulence, and enabling an improvement in the dilution performance.

Here, it is preferable that at least one of the first flow passage and second flow passage have a pipe form, and that the two passages be disposed such that the axes thereof are substantially parallel. According to this constitution, the first flow passage is accommodated within the second flow passage having a normal pipe form, and hence the need to provide a space for a diluter or mixer disappears, enabling a space-saving constitution. Particularly when applied to an electric automobile, the diluter can be disposed within a similar volume to that of the pre-existing exhaust pipe, thereby saving space.

Here, the first flow passage is preferably provided in a position other than the lower portion and upper portion of the second flow passage in the vertical direction thereof. According to this constitution, the first flow passage avoids the roof portion and base portion of the second flow passage, where the gas concentration rises easily, and the base portion where the liquid components contained in the gas accumulate easily. As a result, an improvement in the dilution performance can be expected.

Here, the liquid discharge port is preferably provided in the lower portion of the second flow passage in the vertical direction thereof. According to this constitution, when liquid components contained in the gas aggregate or the like, the liquid can be discharged without accumulating in the second flow passage.

Here, at least one of the flow passages for the first gas and second gas preferably comprises a bent portion. By providing a bent portion, a disturbance is created in the gas flow, thus facilitating the generation of turbulence and promoting the mixing of the gases.

This gas processing device further comprises first gas supply means configured to supply the first gas, and second gas supply means configured to supply the second gas. The second gas supply means supplies the second gas in accordance with the timing at which the first gas is supplied from the first gas supply means. According to this constitution, the amount of second gas to be mixed can be increased in accordance with the timing at which the first gas is supplied, and hence the mixture ratio of the diluted mixed gas can be made even, thereby enabling an improvement in the mixing performance.

This gas processing device is used in a fuel cell system, and hence the first gas may be hydrogen gas discharged from the fuel cell system, and the second gas may be air for diluting the hydrogen gas. Here, the volume of the second flow passage is preferably set smaller than the amount of purge gas produced during a low load operation of the fuel cell. According to this constitution, the hydrogen gas that is introduced during a purging operation is unable to accumulate inside the second flow passage, and hence the hydrogen gas is always discharged outside after dilution, enabling an improvement in the mixing performance.

According to the present invention described above, turbulence is generated between the first gas and second gas so that the two gases are mixed, and hence the first gas can be diluted with the second gas evenly, without localized unevenness in the gas concentration.

Also according to the present invention, the flow passage for one of the gases is surrounded by the flow of the other gas, and hence even when a liquid component which may freeze is contained within the gas flowing through the flow passage, freezing of the liquid component in the flow passage is suppressed by the presence of the other gas.

DESCRIPTION OF DRAWINGS

FIG. 3 is a sectional view severed along the vertical plane in the axial direction of the gas processing device according to the first embodiment, wherein

FIG. 4 is a view illustrating the actions of the gas processing device according to the first embodiment, wherein

FIG. 8 is a view illustrating a gas processing device according to a third embodiment, wherein

FIG. 9 is a view illustrating the gas processing device according to the third embodiment, wherein

DETAILED DESCRIPTION

Next, preferred embodiments for carrying out the present invention will be described with reference to the drawings.

First Embodiment

In a first embodiment of the present invention, a gas processing device of the present invention is applied to a diluter which is suitable for use in a fuel cell system installed in an electric automobile. The first embodiment of the present invention relates particularly to a gas processing device which mixes hydrogen gas to be diluted with air serving as a hydrogen gas diluting medium by generating turbulence around the periphery of a supply pipe for supplying the air. The following embodiment is merely one aspect of the present invention, and the present invention is not limited to application in this embodiment alone. For the sake of convenience, a first gas of the present invention is exemplified as hydrogen gas, and a second gas is exemplified as air.

Figure 5:
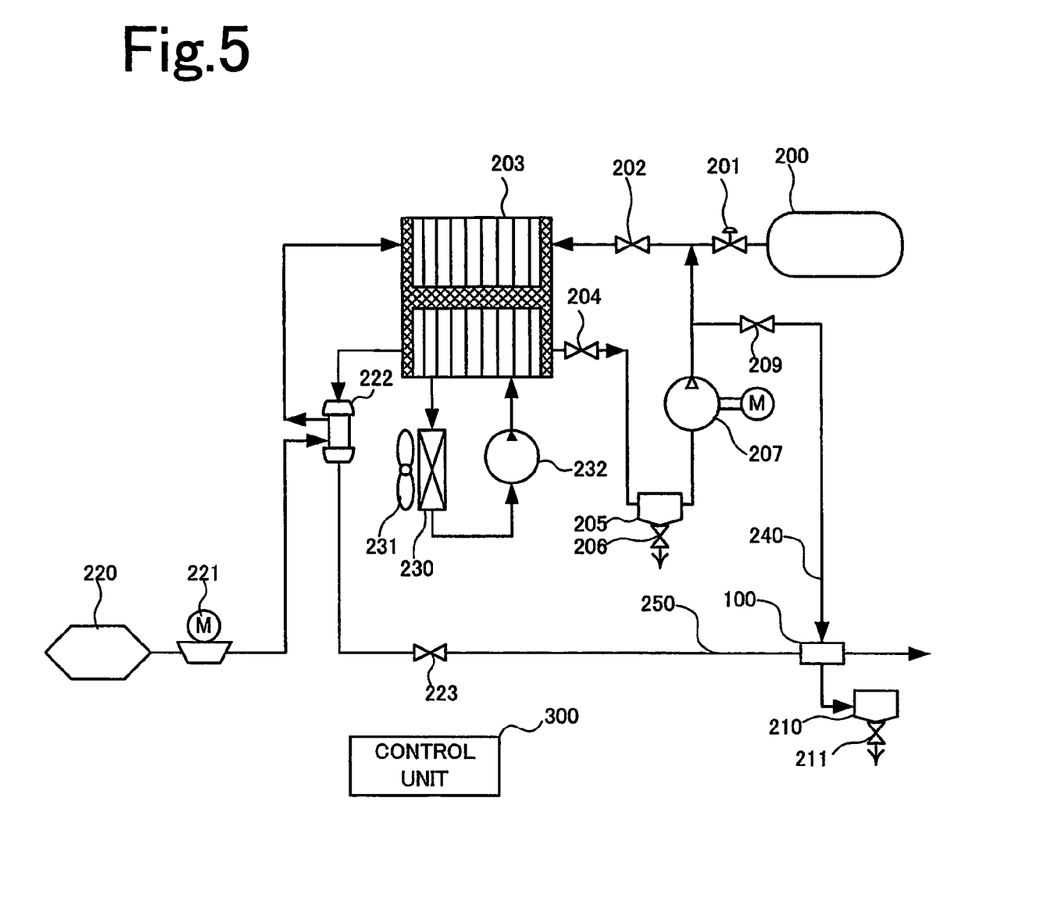
FIG. 5 is a system diagram of a fuel cell system to which the gas processing device of this embodiment is applied.

FIG. 5 is a system diagram of a fuel cell system. As shown in FIG. 5, the fuel cell system of this embodiment is constructed around a fuel cell stack 203. The fuel cell stack 203 has a stack structure constituted by a plurality of laminated cells, each comprising a separator having passages for hydrogen gas, air, and cooling water, and an MEA (Membrane Electrode Assembly) which is sandwiched between a pair of the separators. The MEA comprises a polymer electrolyte membrane sandwiched between two electrodes, a fuel electrode (anode) and an air electrode (cathode). The fuel electrode is provided with a fuel electrode catalyst layer in porous support form, and the air electrode is provided with an air electrode catalyst layer in porous support form. A system for supplying hydrogen, which serves as fuel, to the fuel cell stack 203 thus constituted is a fuel electrode system, and a system for supplying air is an air electrode system. A cooling system for cooling the fuel cell stack 203, which performs an exothermic reaction, and an exhaust system according to the present invention are also provided.

In the fuel electrode system, pure hydrogen from a hydrogen tank 200 is supplied through a pressure reducing valve 201, and a hydrogen circulation system is formed by a shut-off valve 202, the fuel electrode of the fuel cell stack 203, a shut-off valve 204, a gas-liquid separator 205, a shut-off valve 206, a pump 207, and so on.

In the air electrode system, air is supplied to the air electrode side of the fuel cell stack 203 through an air cleaner 220, a compressor 221, and a humidifier 222.

In the cooling system, cooling water is circulated to the fuel cell stack 203 through a radiator 230, a fan 231, and a cooling pump 232.

As for the exhaust system, hydrogen (hydrogen off-gas) is discharged from the hydrogen circulation system through a shut-off valve 209 in a purging operation, and then supplied to a diluter 100 according to the present invention through a hydrogen flow pipe 240. Meanwhile, exhaust gas (air off-gas) from the air electrode system passes through the humidifier 222, and is then supplied to the diluter 100 through an exhaust gas flow pipe 250 at a flow rate that is controlled by a pressure control valve 223. Liquid and gas discharged from a liquid discharge port 105 (see FIG. 1) of the diluter 100 are discharged through a liquid-gas separator 210 and a shut-off valve 211.

Note that the pressure control valve 223 may be substituted by an opening regulation valve which is capable of modifying the opening of the exhaust gas flow pipe 250, or an opening-close valve provided on a bypass passage parallel with the exhaust gas flow pipe 250. In other words, any valve constitution which is capable of modifying the flow rate (pressure) of the gas flowing into the diluter 100 disposed downstream of the exhaust gas flow pipe 250 may be used appropriately in place of the pressure control valve 223.

A control unit 300 is a well-known computer system such as an ECU (Electric Control Unit), and is capable of controlling the entire fuel cell system. More specifically, each valve can be open/close controlled on the basis of detection signals or the like from various sensors not shown in the drawing. Particularly in this embodiment, the control unit 300 is programmed to be capable of control to increase the air off-gas flow rate by opening the pressure control valve 223 further in accordance with the timing at which hydrogen off-gas is supplied through the open shut-off valve 209, raising the rotation speed of the compressor 221, or performing both of these operations in parallel.

Next, the actions of this fuel cell system will be described. A fuel cell produces the reverse reaction of water electrolysis, and hence hydrogen gas containing hydrogen is supplied to the side of the fuel electrode, which is an anode, and gas (air in this embodiment) containing oxygen is supplied to the side of the air electrode, which is a cathode. A reaction such as that shown in Equation (1) is produced on the fuel electrode side, and a reaction such as that shown in Equation (2) is produced on the air electrode side, whereupon electrons are circulated such that a current flows. As a whole, the system produces the reverse reaction of water electrolysis, as shown in Equation (3).

$$H_2 \rightarrow 2H^+ + 2e^- \tag{1}$$

$$2H^+ + 2e^- + (1/2)O_2 \rightarrow H_2O \tag{2}$$

$$H_2 + (1/2)O_2 \rightarrow H_2O \tag{3}$$

To produce the reaction in Equation (1), the hydrogen tank 200 comprises a hydrogen absorbing alloy in its interior. The hydrogen absorbing alloy has qualities such that when heated, hydrogen is discharged through an endothermic reaction, and when cooled, hydrogen is absorbed through a thermolytic reaction. The hydrogen tank 200 can be controlled to discharge a desired quantity of hydrogen using a heat exchange system not shown in the drawing.

During an operation, hydrogen gas generated by heating the hydrogen tank 200 is depressurized by the pressure reducing valve 201, and then supplied to the fuel cell stack 203 through the opened shut-off valve 202. In the fuel electrode of the fuel cell stack 203, power generation is performed by producing a reaction such as that shown in Equation (1) to emit electrons. The hydrogen gas that is discharged from the fuel cell stack 203 is known as off-gas, and contains moisture and other impurities. In the liquid-gas separator 205, the moisture and other impurities are removed from the hydrogen off-gas and discharged outside through the shut-off valve 206. Once the moisture and so on has been removed, the hydrogen gas is pressurized by the pump 207 and returns to the main flow from the hydrogen tank 200. The pump 207 varies the hydrogen off-gas supply rate in order to stabilize the electric energy and voltage that are output in accordance with the amount of power generated by the fuel cell system. This single cycle constitutes the circulation system. When the shut-off valve 209 is opened by control means, a part of the hydrogen off-gas in the circulation system is supplied to the diluter 100 according to the present invention through the hydrogen flow pipe (first flow passage) 240. Note that during start-up or the like when the temperature of the hydrogen tank 200 is low and hydrogen gas is not emitted sufficiently, the shut-off valve 209 may be closed and the shut-off valves 202 and 204 opened such that hydrogen gas is drawn from the hydrogen tank 200.

Note that in place of the hydrogen absorption tank 200 in this embodiment, hydrogen may be supplied from a high-pressure hydrogen tank not comprising a hydrogen absorption function, a hydrogen supply mechanism using reformed gas, or a liquid hydrogen tank.

To produce the reaction in Equation (2), meanwhile, the compressor 221 is driven to draw air from the air cleaner 220. Having been cleaned by the air cleaner 220 and drawn into the compressor 221, the air is raised to an appropriate humidity by the humidifier 222 and supplied to the air electrode of the fuel cell stack 203, where the electrochemical reaction of Equation (2) is produced to generate water. In the air electrode, the oxygen component of the air drawn from the air cleaner 220 and hydrogen ions supplied from the fuel electrode combine with electrons to produce water. The air that has passed through the fuel cell stack 203 then passes through the humidifier 222 as air off-gas, and is supplied to the diluter 100 according to the present invention through the air flow pipe (second flow passage) 250 at a flow rate that is controlled by the pressure control valve 223.

Figure 1:
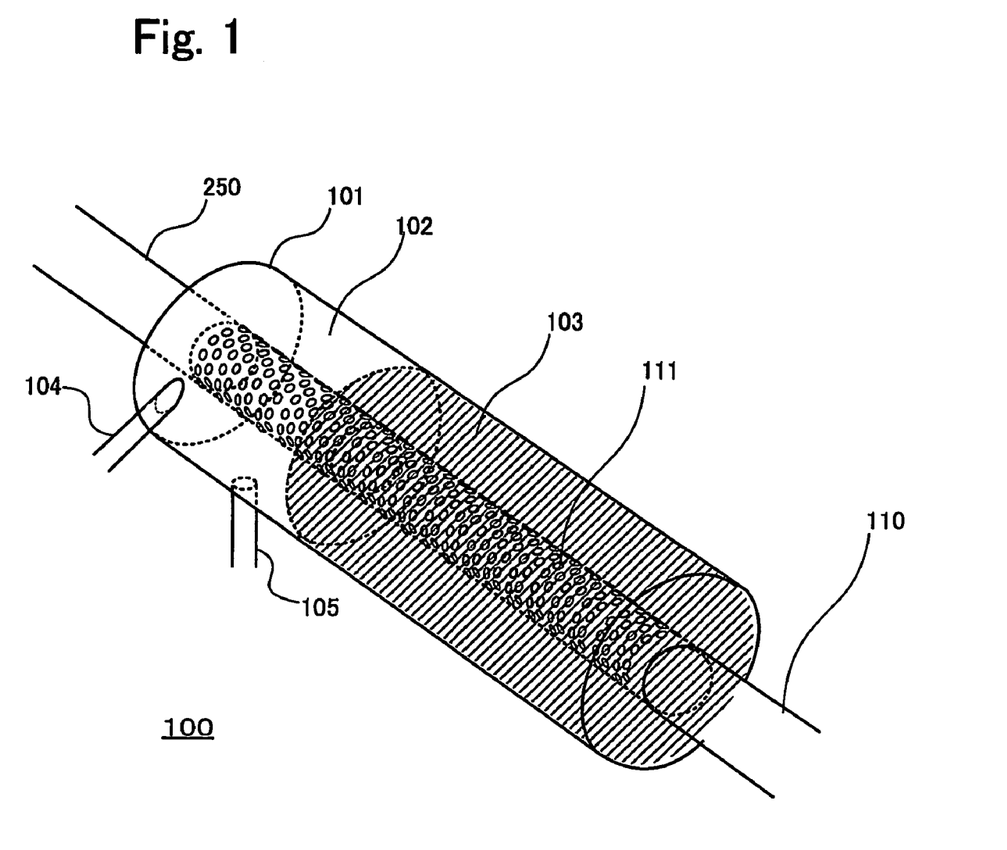
FIG. 1 is a transparent perspective view of a gas processing device according to the first embodiment.
Figure 2A:
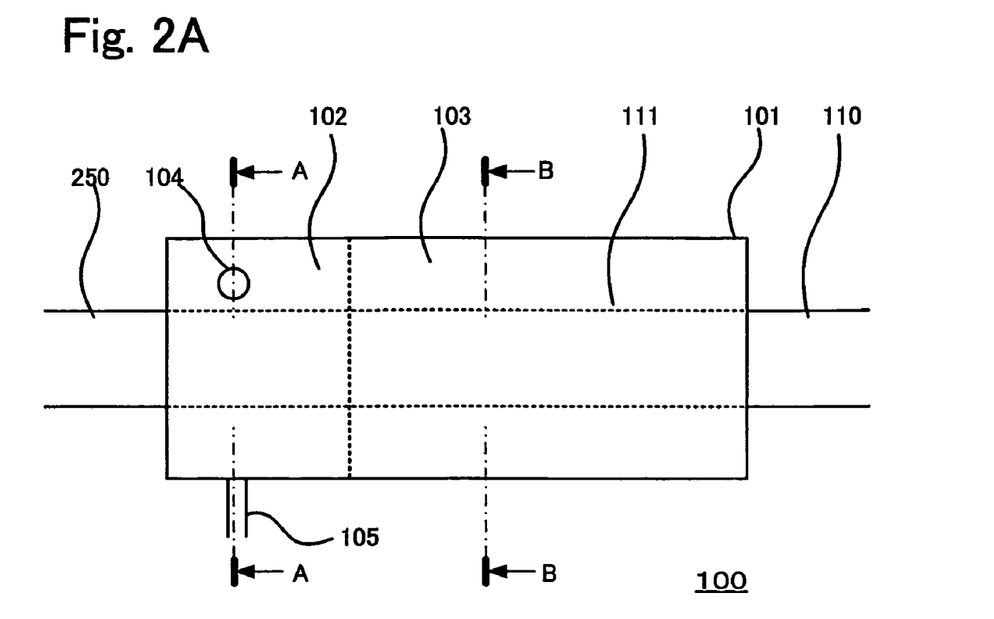
FIGS. 2A and 2B are a side view and a sectional side view respectively of the gas processing device according to the first embodiment.
Figure 2B:
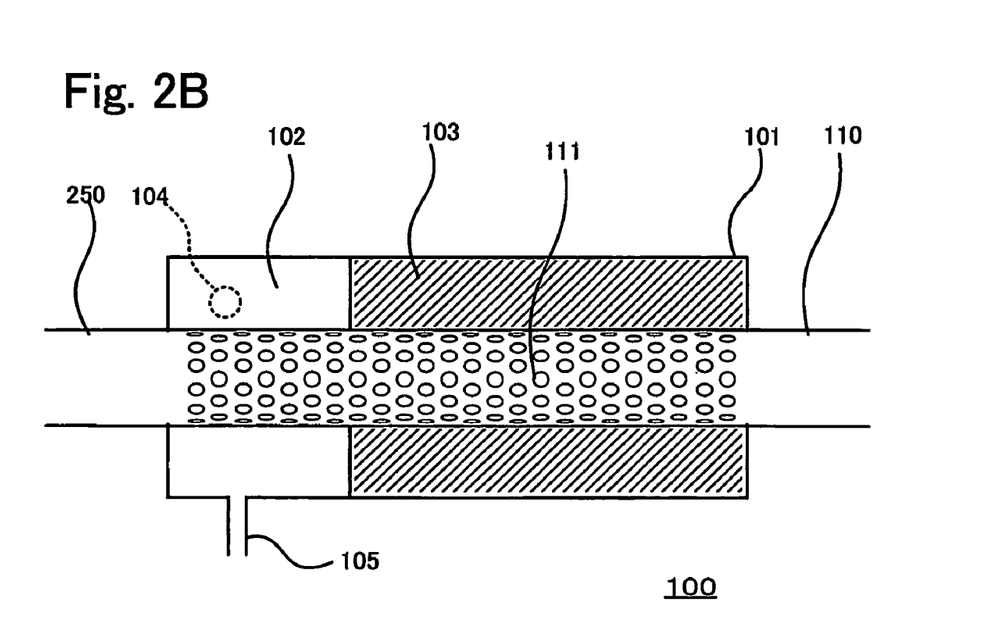
Figure 3A:
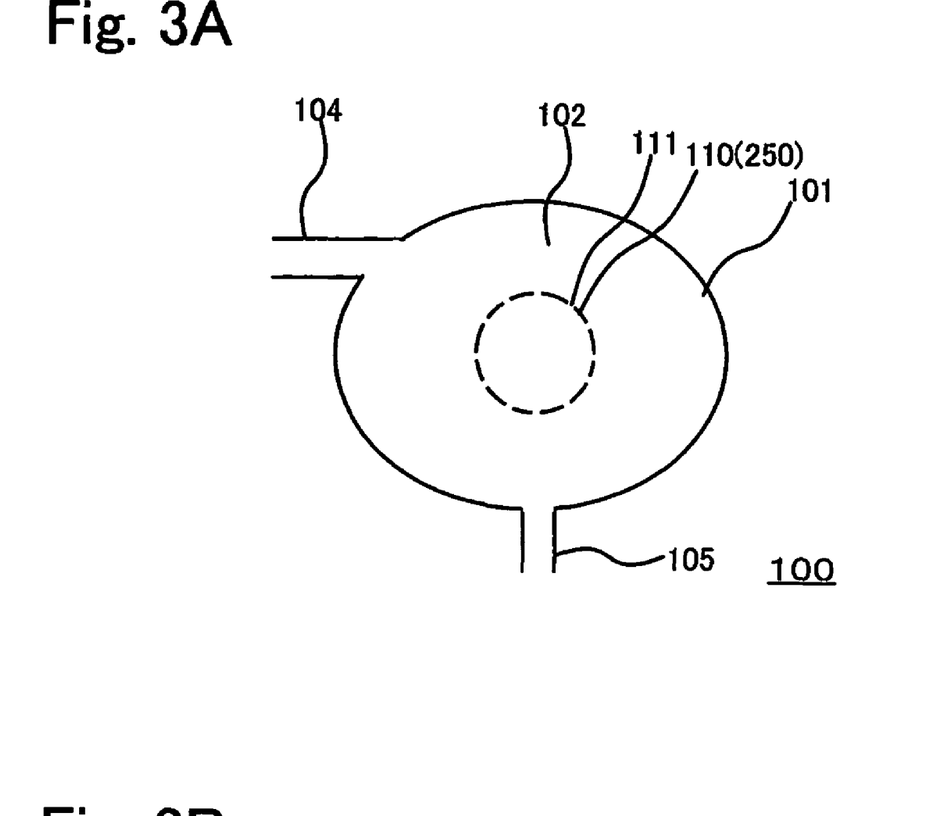
FIG. 3A is a sectional view severed along an A-A line in FIG. 2.
Figure 3B:
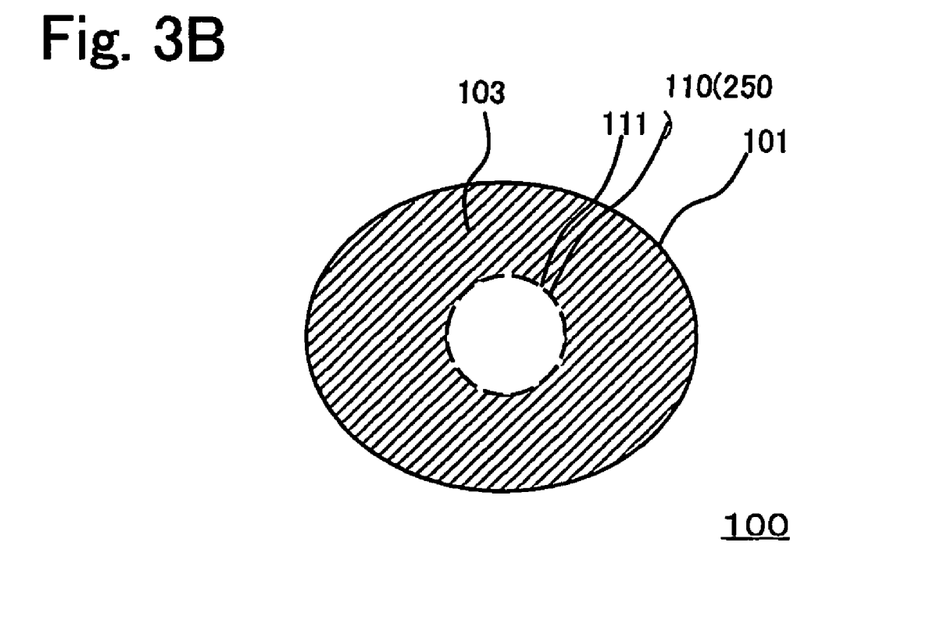
FIG. 3B is a sectional view severed along a B-B line in FIG. 2.

Next, referring to FIGS. 1 through 3, the diluter 100 according to the present invention will be described. FIG. 1 is a transparent perspective view of the diluter 100, and FIGS. 2A and 2B are a side view and a sectional side view of the diluter respectively. FIG. 3 is a sectional view of the diluter severed along the vertical plane in the axial direction, FIG. 3A being a sectional view along an A-A line in FIG. 2, and FIG. 3B being a sectional view along a B-B line in FIG. 2.

As shown in the drawings, the diluter 100 comprises an inflow port 104 for introducing hydrogen off-gas into a housing 101, which seals a part of the air flow pipe 250, from a non-parallel direction to the flow direction of the air off-gas. The inflow port 104 is provided to enable hydrogen off-gas to be introduced in an offset position from the axial center of the housing 101. The hydrogen flow pipe 240 communicates with the inflow port 104. A large number of hole structures 111 is provided in the region of the air flow pipe 250 that is sealed inside the housing 101 so that the air flowing through the air flow pipe 250 and the hydrogen gas introduced through the inflow port 104 can pass between the housing and the air flow pipe 250.

The volume of the housing 101 in this case is preferably smaller than the amount of purge gas produced during a low load operation of the fuel cell system (during idling or the like). By making the volume smaller than the amount of hydrogen off-gas produced during purging, a flow velocity is always generated inside the diluter 100 during purging, and hence accumulations of hydrogen off-gas can be prevented.

Glass wool 103, which corresponds to the agitating member of the present invention, is filled into the downstream side of the housing 101 in the flow direction of the air flowing through the air flow pipe 250. Glass wool is a felt-like substance formed by melting glass raw material in a high-temperature furnace until formed into fibers, spraying the fibers with an adhesive, and then heat molding the fibers. Since glass wool is formed as bundles of fine filaments, a plurality of gases can be agitated efficiently. Moreover, glass wool exhibits an excellent sound-absorption performance, and hence is advantageous in cases where the diluter 100 also functions as a silencer (muffler). Note, however, that the agitating member is not limited to glass wool as long as the air and hydrogen gas can be agitated. There are no limitations on the method of filling the glass wool into the housing 101, but it is preferably filled to a density which allows gas to pass through. The reason for this is that it is desirable for agitation and turbulence to be generated when the gas passes between the felt-like fibers.

The glass wool 103 is disposed on the downstream side in the air flow direction, and hence a space 102 is formed on the upstream side of the housing 101 in the air flow direction. As well as the aforementioned inflow port 104 for introducing hydrogen gas, the space 102 comprises a liquid discharge port 105 at the lower portion of the space 102 in the vertical direction.

Figure 4A:
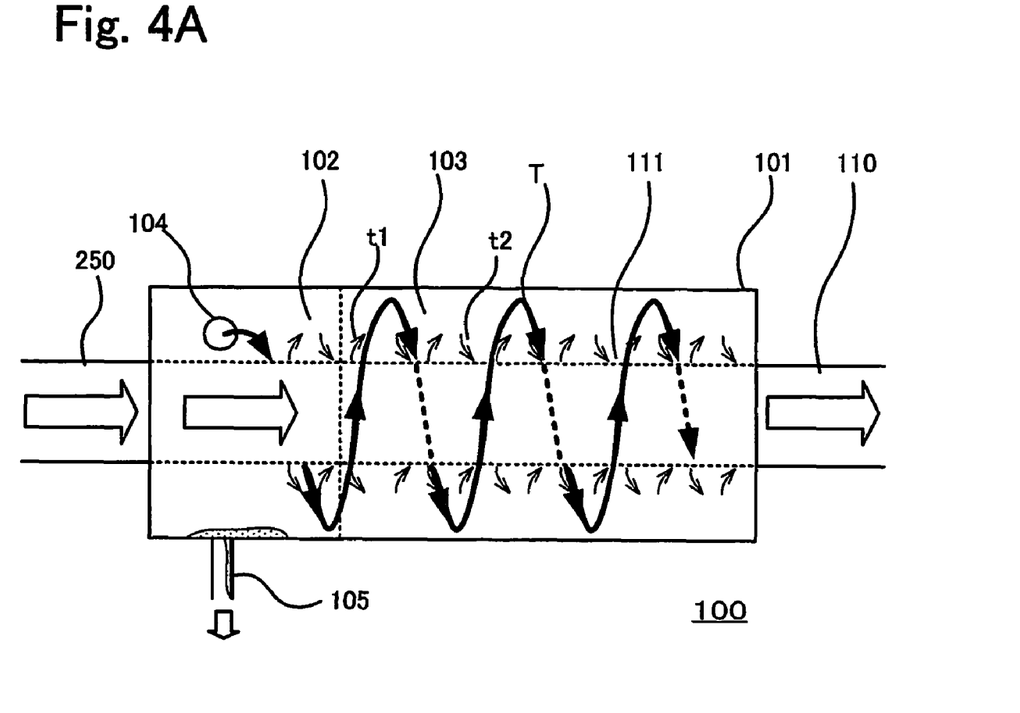
FIG. 4A is a schematic view illustrating turbulence generation from the side.
Figure 4B:
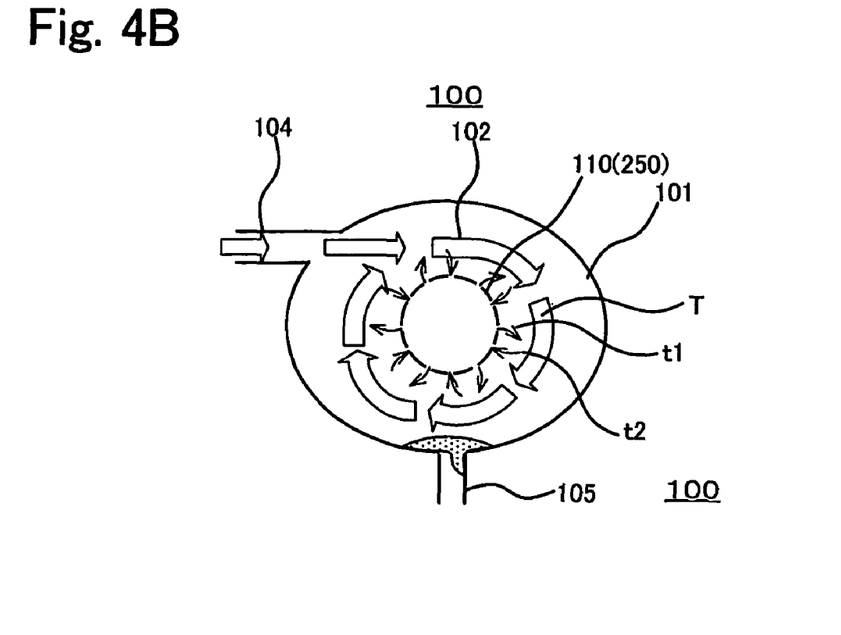
FIG. 4B is a schematic view illustrating rotational flow generation from the front.

Next, referring to FIG. 4, the actions of the diluter 100 will be described. FIG. 4A is a schematic view illustrating turbulence generation from the side, and FIG. 4B is a schematic view illustrating rotational flow generation from the front.

According to this embodiment, each individual constitution acts organically such that the diluter 100 functions as turbulence generating means for generating turbulence to mix together the air off-gas and hydrogen off-gas. First, in the fuel cell system of FIG. 5, the shut-off valve 209 is opened by the control of the control unit 300 when the impurity concentration of the hydrogen gas in the hydrogen system, which is circulated by the pump 207, rises or is predicted to rise. As a result of this operation, the hydrogen gas containing impurities (hydrogen off-gas) is discharged from the circulation system to the hydrogen flow pipe 240. To prevent the generation efficiency from decreasing, the discharged hydrogen gas containing impurities is replaced by pure hydrogen gas supplied from the hydrogen tank 200 in an amount corresponding to the amount of discharged impure hydrogen gas.

The hydrogen off-gas discharged at this time passes through the hydrogen flow pipe 240, and enters the housing 101 through the inflow port 104 of the diluter 100. Since the inflow port 104 through which the hydrogen off-gas enters is provided in an offset position from the axial center of the housing 101, the hydrogen off-gas that flows into the housing 101 from the inflow port 104 generates a rotational flow T around the air flow pipe as shown in FIG. 4B.

Meanwhile, the air off-gas that is discharged from the air electrode system in the fuel cell system of FIG. 5 passes through the air flow pipe 250 and, as shown in FIG. 4A, flows rightward from the left side of the drawing. The control unit 300 in particular increases the flow rate of the air off-gas by further opening the pressure control valve 223, which controls the air off-gas flow rate, in accordance with the timing at which hydrogen off-gas is purged through the open shut-off valve 209, by raising the rotation speed of the compressor 221, or by performing both of these processes in parallel. As a result, a large amount of air off-gas is supplied to the diluter 100.

A region in the interior of the housing 101 of the diluter 100 is provided with the hole structures 111, and hence an airflow t1 which passes through the hole structures 111 into the housing 101 is generated. Here, the rotational flow T of hydrogen off-gas is produced inside the housing 101, and hence the rotational flow T collides with the airflow t1 flowing through the hole structures 111 of the air flow pipe 250 to produce turbulence between the hydrogen off-gas and air off-gas. The two gases are efficiently homogenized and diluted by this turbulence. The mixed gas, or in other words the hydrogen off-gas diluted with the air off-gas, forms a return flow t2 which returns into the air flow pipe 250 through the hole structures 111, and is thus discharged together with the main flow of air. By means of this action, the hydrogen off-gas concentration is diluted to no more than a predetermined concentration (4%, for example) and then discharged outside.

Here, the volume of the housing 101 is set to be smaller than the amount of purge gas, and hence a flow velocity is always generated inside the diluter 100 during purging, thereby preventing accumulations of hydrogen off-gas inside the diluter.

Dilution of the two off-gases is promoted by increasing the flow rate of the air off-gas by having the control unit 300 open the pressure control valve 223 further in synchronization with the purging of the hydrogen off-gas, raise the rotation speed of the compressor 221, or perform both of these processes in parallel.

The diluter 100 is also provided with the liquid discharge port 105. The hydrogen off-gas contains moisture, but since the hydrogen off-gas flowing into the housing 101 from the inflow port 104 forms the rotational flow T, the moisture contained in the hydrogen off-gas, which has a comparatively large mass, becomes adhered to the wall surface of the housing 101 by means of centrifugal force. The adhered moisture aggregates in the lower portion of the housing 101 in the vertical direction, and is discharged through the liquid discharge port 105 provided in this region. Moisture is also separated in the gas-liquid separator 210 and discharged in according with the opening and closing of the shut-off valve 211. More specifically, the liquid discharge port 105 is provided in the space in front of the glass wool 103, and hence unwanted moisture can be prevented from accumulating in the glass wool, which serves as the agitating member, and thereby adversely affecting the agitating performance and silencing performance.

Note that in the first embodiment, an example was described in which the air flow pipe 250 comprising the hole structures 111 is provided in the housing, and the glass wool 103 is filled into the housing, as shown in FIGS. 1 to 3. However, these members are not vital constitutional elements.

In other words, the air flow pipe 250 or (and) the glass wool 103 inside the housing 101 may be omitted. It is sufficient to provide only the housing 101 communicating with the air flow pipe 250 and the inflow port 104 for introducing hydrogen off-gas into the housing 101.

Further, the opening form of the hole structures 111 is not limited to a circular form. In other words, the hole openings may be elongated or polygonal. In the case of holes having a longitudinal direction, the longitudinal direction may be disposed either parallel or non-parallel to the passage flow direction.

Instead of the hole structures, a rectifying member configured to rectify the gas flow in a predetermined direction or a turbulence member for generating turbulence may be provided. Alternatively, these members may be combined appropriately or partially omitted.

In short, the form, number, and manner of disposal of the hole structures may be modified selectively in a variety of ways as long as they facilitate the generation of turbulence when air off-gas flows into the space 102 in the housing 101 from the air flow pipe 250, and conversely facilitate the influx of gas having as its main component hydrogen off-gas into the air flow pipe 250 from the space 102.

Second Embodiment

Figure 6:
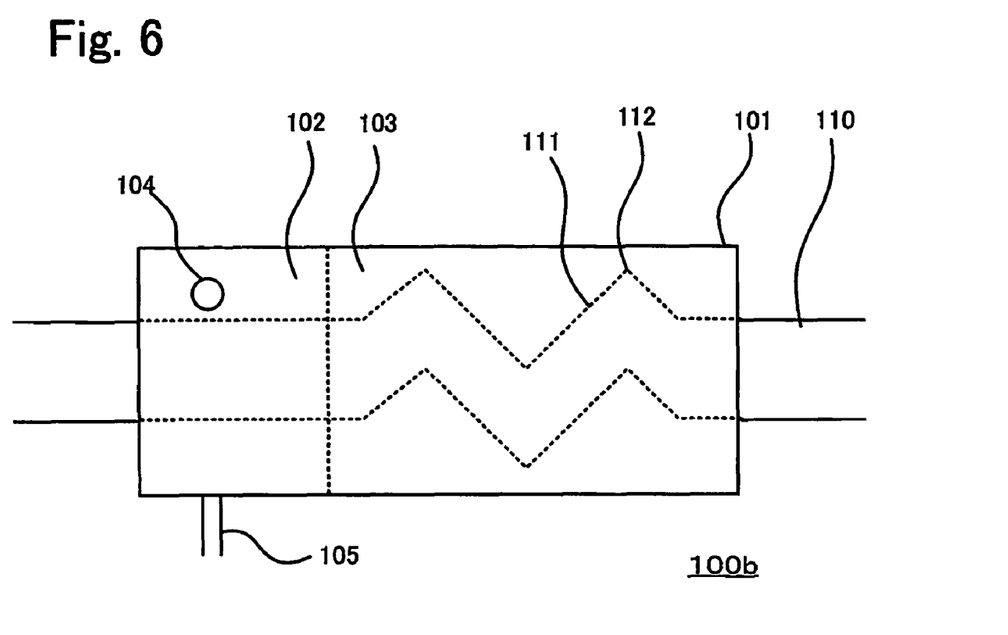
FIG. 6 is a side view of a gas processing device according to the second embodiment.

A second embodiment of the present invention relates to a modified example of the flow passage constitution for further promoting the mixing and dilution of the gases in the diluter of the first embodiment. FIG. 6 shows a side view of a diluter according to the second embodiment. As shown in FIG. 6, a diluter 100b is characterized in comprising a bent portion 112 in a part of a flow passage 110 inside the housing 101. All other constitutions are identical to those of the first embodiment.

With this constitution, the flow direction of the air off-gas which flows through the flow passage 110 is modified forcibly by the curves in the bent portion 112, thus producing turbulence. As a result, the flow of air off-gas from the hole structures 111 provided around the bent portion 112 of the flow passage increases in intensity. Moreover, the bent portion 112 forms a barrier to the rotational flow T of hydrogen off-gas flowing around the periphery thereof, and hence the hydrogen off-gas is more likely to flow into the hole structures 111 provided in the bent portion 112. In order to promote the dilution and mixing of the gases, the angle of curvature is preferably sharp, but not sharp enough to inhibit the gas flow, for example no less than 45°.

According to the second embodiment, the turbulence generated in the main air off-gas flow through the flow passage 110 and the intensity with which the two gases pass through the hole structures 111 work in conjunction to further promote the mixing and dilution of the two gases.

Figure 7:
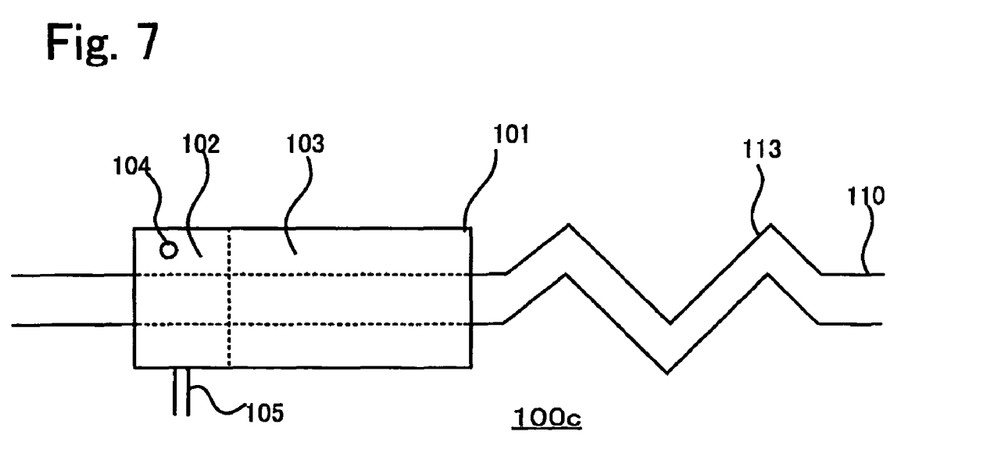
FIG. 7 is a modified example of the gas processing device according to the second embodiment.

Note that the curves in the flow passage 110 need not be inside the housing 101. For example, in a diluter 100c shown in FIG. 7, a bent portion 113 may be provided in the flow passage 110 downstream of the housing 101. Even if the air off-gas and hydrogen off-gas are not diluted sufficiently within the housing 101, turbulence is generated again in the bent portion 113 of the flow passage 110 downstream of the housing, and hence unevenness in the hydrogen off-gas concentration can be corrected, thereby promoting uniform dilution.

Third Embodiment

In the first embodiment, hydrogen off-gas is introduced into the housing surrounding the air off-gas flow passage, and supplied from the periphery of the flow passage. In a third embodiment of the present invention, a hydrogen off-gas flow passage is disposed in the interior of the air off-gas flow passage.

Figure 8A:
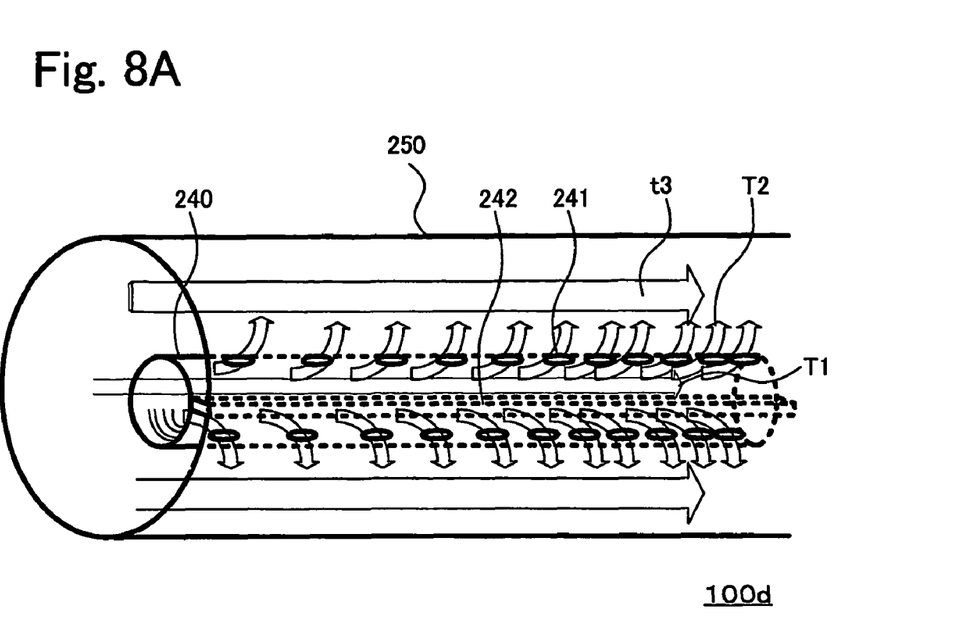
FIG. 8A is a transparent perspective view.
Figure 8B:
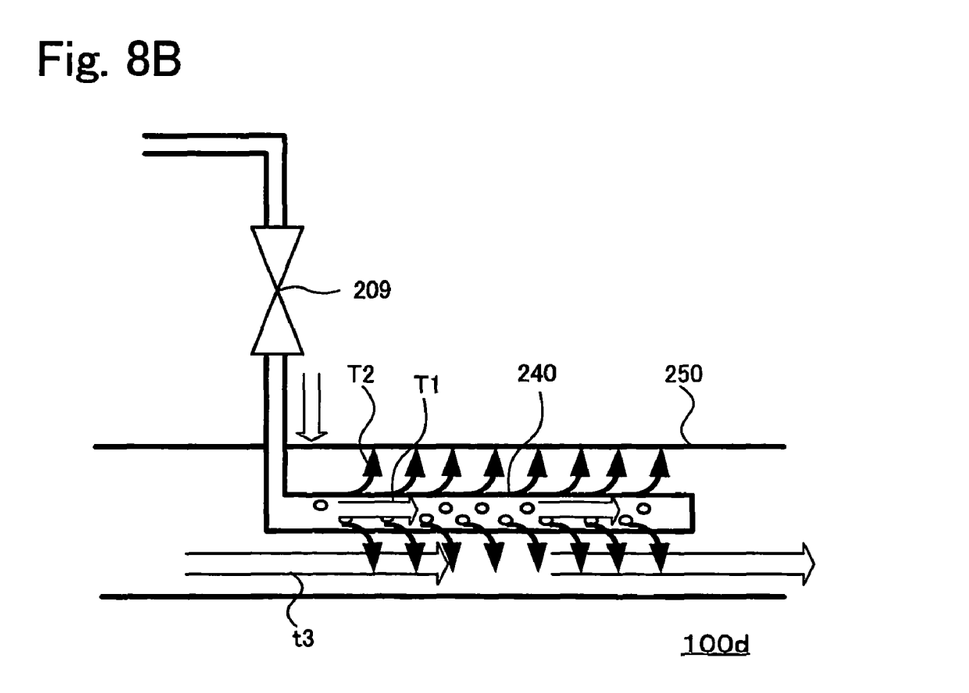
FIG. 8B is a system diagram illustrating gas supply from a shut-off valve.
Figure 9A:
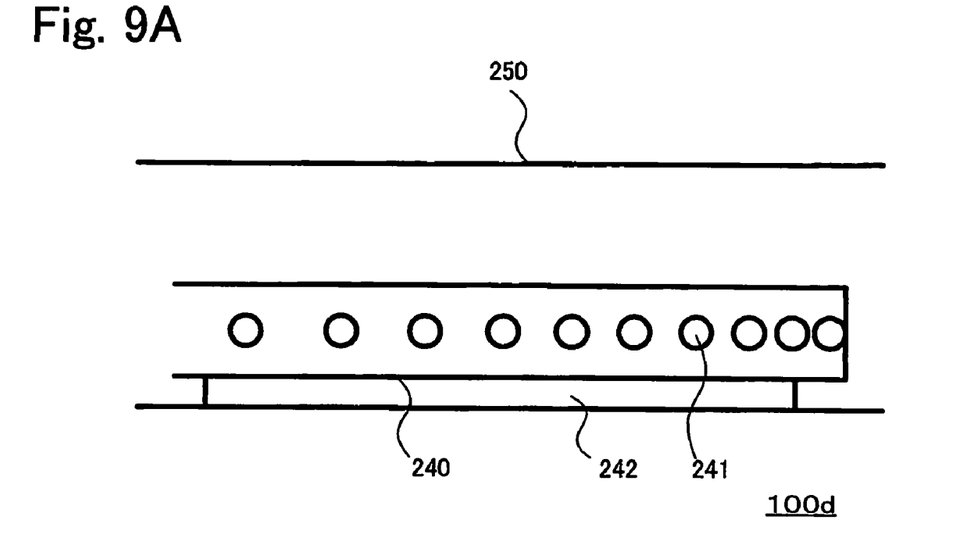
FIG. 9A is a transparent plan view.

The diluter constitution of the third embodiment will now be described with reference to FIGS. 8 and 9. FIG. 8A is a transparent perspective view of the constitution of this diluter, and FIG. 8B is a system diagram illustrating gas supply from a shut-off valve. FIG. 9A is a transparent plan view of the diluter, and FIG. 9B is a sectional view thereof.

As shown in these drawings, a diluter 100d of the third embodiment is accommodated inside the air flow pipe 250 described in the first embodiment, with the hydrogen flow pipe 240 disposed on the interior wall of the air flow pipe 250 substantially parallel with the flow direction of the air off-gas. As shown in FIG. 8B, the hydrogen flow pipe 240 is inserted into the air flow pipe 250 downstream of the shut-off valve 209 such that the axial direction of the pipe is in substantial alignment with the axial direction of the air flow pipe 250. A plurality of hole structures 241 is provided in the hydrogen flow pipe 240 as a diffusion structure for causing the hydrogen off-gas to flow out into the air flow pipe 250 in a different direction to the flow direction of the air off-gas. The hole structures 241 are provided such that the total hole opening area per unit area increases toward the downstream side of the hydrogen off-gas flow direction. To increase the total hole opening area, the number of holes per unit area may be increased as shown in the drawing, or the opening diameter of the holes may be increased without increasing the number of holes. Further, the hole structures 241 are provided in the lower portion of the hydrogen flow pipe 240 in the vertical direction and the upper portion of the hydrogen flow pipe 240 in the vertical direction.

Note that the end of the hydrogen flow pipe 240 is closed. The gases can be mixed without closing the end, but by closing the end, the flow of hydrogen off-gas through the hole structures into the air flow pipe 250 intensifies, causing the hydrogen off-gas and air off-gas to collide more violently so that turbulence is generated and dilution is promoted.

Figure 9B:
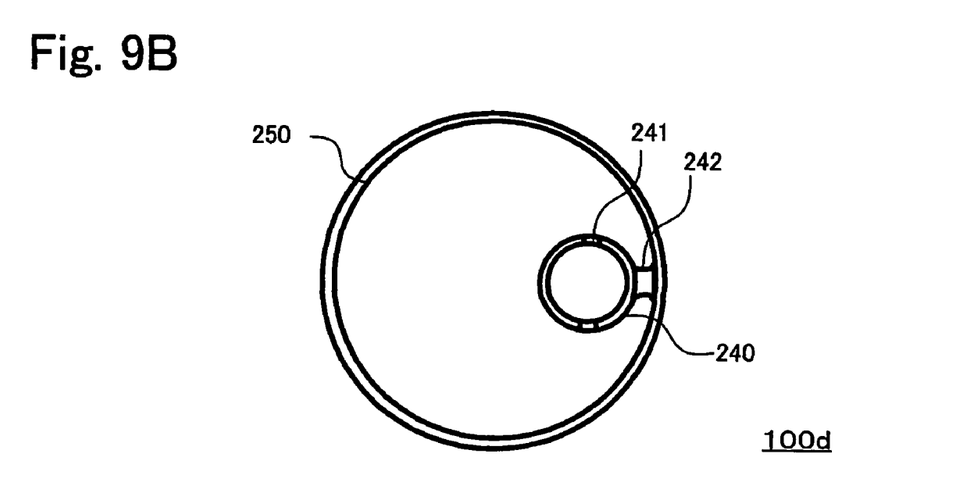
FIG. 9B is a sectional view.

As can be seen from FIGS. 9A and 9B, the hydrogen flow pipe 240 is supported on a wall surface of the air flow pipe 250 other than the lower portion and upper portion thereof in the vertical direction by a support structure 242 or the like. More specifically, the hydrogen flow pipe 240 is supported by the support structure in an offset position on a side face of the interior wall of the air flow pipe 250. Note, however, that in cases where the hydrogen flow pipe has a high rigidity or the length of the diluter 100d is limited, the support structure does not have to be provided.

The volume of the hydrogen flow pipe 240 contained within the air flow pipe 250 is set to be smaller than the amount of purge gas produced during a low load operation of the fuel cell.

In this constitution, similarly to the first embodiment, when the control unit 300 (see FIG. 5) opens the shut-off valve 209 to supply hydrogen off-gas in a purging operation, the pressure control valve 223 in the air electrode system is controlled in accordance with the timing of the purging operation to increase the air flow rate. In the diluter 100d, a hydrogen flow T1 supplied from the shut-off valve 209 flows into the hydrogen flow pipe 240 as shown in FIG. 8. Since the hole structures 241 are provided in the hydrogen flow pipe 240 in this case, the hydrogen flow T1 branches out gradually through the hole structures 241 over the entire length of the hydrogen flow pipe 240, and flows in the form of a hydrogen branch flow T2 in a different direction to an airflow t3 flowing through the air flow pipe 250, preferably in a substantially right-angled direction to the airflow t3.

Meanwhile, the airflow t3 of air off-gas flows around the hydrogen flow pipe 240, thus colliding with the emitted hydrogen branch flow T2 around the hydrogen flow pipe 240 to generate turbulence. The hydrogen off-gas and air off-gas are mixed and diluted by this turbulence.

Note that in this embodiment, similarly to the first embodiment, a liquid discharge port is preferably provided inside the air flow pipe 250. By providing the liquid discharge port, liquid components contained in the gas which aggregate and so on can be discharged without accumulating inside the air flow pipe 250.

Also in this embodiment, similarly to the second embodiment, a bent portion is preferably provided in either the hydrogen flow pipe 240 or the air flow pipe 250. By providing the bent portion, a disturbance can be created in the gas flow, thus facilitating the generation of turbulence and promoting mixing of the gases.

According to the third embodiment described above, the air flow pipe 250 is provided surrounding the hydrogen flow pipe 240, and the two pipes are disposed substantially parallel to each other. As a result, the hydrogen off-gas is mixed with the air off-gas in such a manner that localized unevenness in the hydrogen concentration can be suppressed, enabling an improvement in the dilution performance.

Due to the constitution whereby one pipe is surrounded by the other, hydrogen can be diluted over a long area within the air flow pipe 250 when the length of the hydrogen flow pipe 240 is secured to a certain degree. As a result, the amount of hydrogen off-gas per unit length can be reduced greatly below that of conventional devices, which is desirable in terms of safety.

Further, since the hydrogen flow pipe 240 is accommodated in the interior of the air flow pipe 250, the need to provide a separate space for a diluter or mixer is eliminated, and hence space can be saved.

Further, according to this constitution, the hydrogen off-gas, which contains moisture by nature, flows through the hydrogen flow pipe 240 enveloped in the air flow pipe 250. The air off-gas receives a certain amount of reaction heat, and this heat in the air off-gas is able to prevent the moisture contained in the hydrogen flow pipe 240 from freezing. As a result, situations such as the flow pipe becoming blocked by freezing moisture can be avoided, which is also desirable in terms of safety.

Also according to this constitution, even when the sound of the gas flow diffusing through the hydrogen flow pipe 240 is loud, the outside of the hydrogen flow pipe 240 is covered by the pipe wall of the air flow pipe 250, and hence a favorable noise prevention effect is obtained.

Also according to this constitution, the concentration of the hydrogen off-gas flowing through the hydrogen flow pipe 240 is high. However, the outside of the hydrogen flow pipe 240 is covered by the pipe wall of the air flow pipe 250 such that even if the hydrogen off-gas ignites, safety can be ensured.

Further, the hole structures 241 serving as a diffusion structure are opened so as to cause the hydrogen off-gas to flow in a substantially orthogonal direction to the flow direction of the air off-gas. As a result, the hydrogen off-gas flows orthogonally to the air off-gas, thus colliding with the air off-gas to generate turbulence, and hence an improvement in the dilution performance can be expected.

Moreover, the hole structures 241 are provided such that the total hole opening area per unit area increases toward the downstream side of the hydrogen off-gas flow direction, and hence the hydrogen off-gas concentration increases toward the upstream side of the hydrogen flow pipe 240 and decreases toward the downstream side. Thus when hydrogen off-gas flowing out from the hole structures 241 mixes with the air off-gas, the hydrogen off-gas concentration of the mixed gas can be made uniform in all locations, thus suppressing unevenness in the hydrogen off-gas concentration within the air flow pipe 250, which is desirable in terms of safety when handling the hydrogen.

Further, the hole structures 241 are provided in the lower portion of the hydrogen flow pipe 240 in the vertical direction, and hence liquid aggregating within the hydrogen flow pipe 240 can be discharged outside without accumulating in the hydrogen flow pipe 240.

The hole structures 241 are also provided in the upper portion of the hydrogen flow pipe 240 in the vertical direction, and hence the hydrogen off-gas can be discharged outside, or in other words into the air flow pipe 250, and mixed with the air off-gas without accumulating near the roof of the hydrogen flow pipe 240.

The hydrogen flow pipe 240 is supported in the air flow pipe 250 by the support structure 242, and therefore avoids positions other than the lower portion and upper portion of the air flow pipe 250 in the vertical direction. As a result, the hydrogen flow pipe 240 avoids the roof portion and base portion of the air flow pipe 250, where the gas concentration rises easily, and the base portion where the liquid components contained in the gas accumulate easily, thus enabling an improvement in the gas dilution performance.

Moreover, the volume of the hydrogen flow pipe 240 provided inside the air flow pipe 250 is set to be smaller than the amount of purge gas produced during a low load operation of the fuel cell, and hence the hydrogen off-gas introduced during a purging operation is unable to accumulate inside the air flow pipe 250. As a result, the hydrogen off-gas can always be discharged outside after dilution, and the mixing performance can be improved.

Further, the control unit 300 is capable of increasing the flow rate of the air off-gas to be mixed in accordance with the timing at which the hydrogen off-gas is supplied, and hence the mixture ratio of the diluted mixed gas can be made even, enabling an improvement in the mixing performance.

Figure 10:
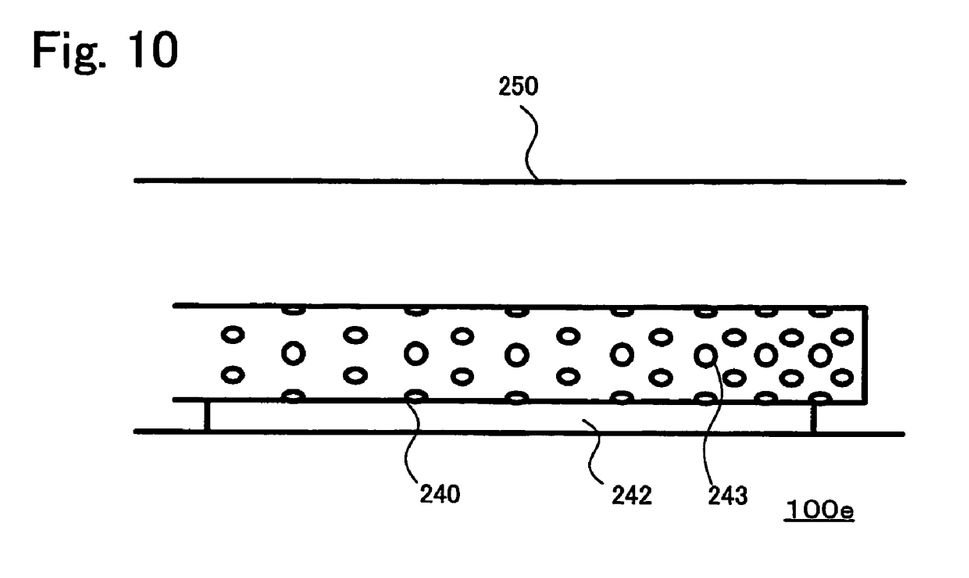
FIG. 10 is a transparent plan view of a modified example of the gas processing device according to the third embodiment.

Note that as a modified example of the third embodiment, a diluter 100e comprising dispersed hole structures 243 rather than the row of hole structures 241 may be provided, as shown in the side view in FIG. 10. Likewise in this case, the hole structures are preferably formed such that the total opening area per unit area increases toward the downstream side.

Figure 11:
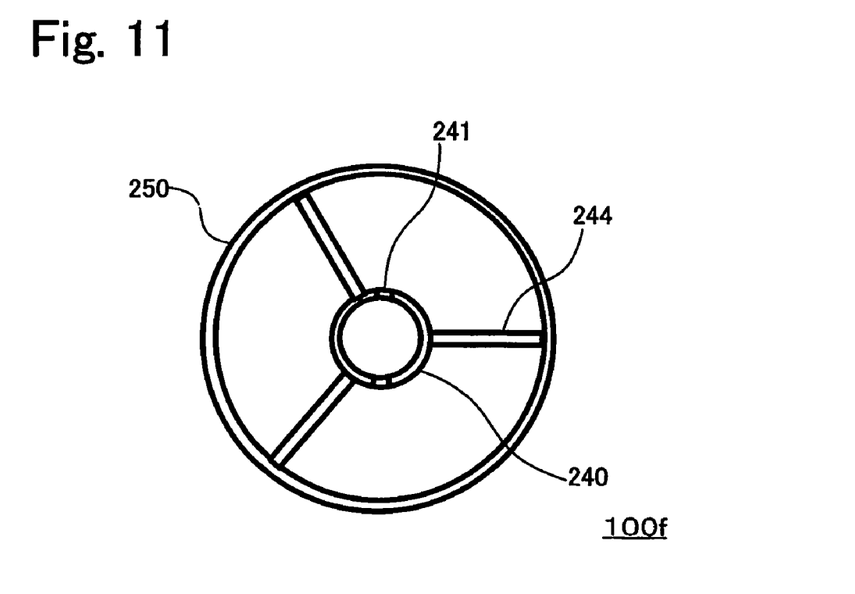
FIG. 11 is a sectional view illustrating another modified example of the gas processing device according to the third embodiment.

As another modified example, the hydrogen flow pipe 240 may be supported in the central portion of the air flow pipe 250 using a support structure 244, as shown in the sectional view in FIG. 11. By means of such a constitution, the hydrogen off-gas is discharged into the central portion away from the wall, where the flow speed of the air off-gas is highest, in a substantially right-angled direction to the flow direction of the off-gas. As a result, the two gases collide violently, and thus the mixing and dilution of the gases can be promoted.

We claim:

1. A gas processing device for mixing a first gas and a second gas, comprising:
    a first flow passage that said first gas flows through;
    a second flow passage that said second gas flows through, said second flow passage surrounding a part of said first flow passage so as to cause said second gas to flow around said first flow passage; and
    a liquid discharge port provided in a lower portion of said second flow passage in the vertical direction of said second flow passage;
    wherein:
        at least said part of said first flow passage surrounded by said second flow passage, is provided with a diffusion structure that diffuses said first gas outside, said diffusion structure being provided over the entire length of said part of said first flow passage surrounded by said second flow passage;
        said diffusion structure is a plurality of hole structures that emit said first gas flowing through said first flow passage in a different direction to the flow direction of said second gas;
        said hole structures are provided such that the total hole opening area per unit area becomes larger toward the downstream side of the flow direction of said first gas; and
        said second flow passage comprises in at least one part of said second flow passage an agitating member for agitating said gases.

2. The gas processing device according to claim 1, wherein said second flow passage is provided with an inflow port that introduces said second gas from a non-parallel direction radially offset with respect to the axial center of the first flow passage.

3. The gas processing device according to claim 1, wherein said agitating member is disposed on the downstream side of the gas flow direction through said second flow passage, and a space is formed on the upstream side of the gas flow direction through said second flow passage, and
    said liquid discharge port being provided in a lower portion of said space in the vertical direction of said space.

4. The gas processing device according to claim 1, wherein said agitating member is glass wool.

5. The gas processing device according to claim 1, wherein said hole structures are provided at least in the lower portion of said first flow passage in the vertical direction of said first flow passage.

6. The gas processing device according to claim 1, wherein said hole structures are provided at least in the upper portion of said first flow passage in the vertical direction of said first flow passage.

7. The gas processing device according to claim 1, wherein said diffusion structure emits said first gas flowing through said first flow passage in a substantially orthogonal direction to the flow direction of said second gas.

8. The gas processing device according to claim 1, wherein at least one of said first flow passage and said second flow passage has a pipe form, the two passages being disposed such that the axes of the two passages are substantially parallel.

9. The gas processing device according to claim 1, wherein said first flow passage is provided in a position other than the lower portion and upper portion of said second flow passage in the vertical direction of said second flow passage.

10. The gas processing device according to claim 1, wherein at least one of said first flow passage gas and said second flow passage gas comprises a bent portion.

11. The gas processing device according to claim 1, further comprising first gas supply means configured to supply said first gas, and second gas supply means configured to supply said second gas,
    wherein said second gas supply means supplies said second gas in accordance with the timing at which said first gas is supplied from said first gas supply means.

12. The gas processing device according to claim 1 for use in a fuel cell system, wherein said first gas is hydrogen gas discharged from said fuel cell system, and said second gas is air for diluting said hydrogen gas,
    the volume of said second flow passage being set smaller than the amount of purge gas produced during a low load operation of the fuel cell.

* * * * *